United States Patent [19]

Matsushima et al.

[11] Patent Number: 4,838,113
[45] Date of Patent: Jun. 13, 1989

[54] THROTTLE ACTUATOR FOR A VEHICLE

[75] Inventors: Seiya Matsushima; Takeshi Yanagisawa; Nobuo Miura; Kuniaki Arakawa, all of Saitama, Japan

[73] Assignee: Honda Giken Kogyo Kabushiki Kaisha, Tokyo, Japan

[21] Appl. No.: 918,991

[22] Filed: Oct. 15, 1986

[30] Foreign Application Priority Data

| Oct. 15, 1985 | [JP] | Japan | 60-157621[U] |
| Oct. 30, 1985 | [JP] | Japan | 60-243262 |
| Oct. 30, 1985 | [JP] | Japan | 60-243264 |
| Oct. 30, 1985 | [JP] | Japan | 60-243263 |
| Nov. 1, 1985 | [JP] | Japan | 60-245339 |
| Nov. 1, 1985 | [JP] | Japan | 60-245338 |
| Jun. 12, 1986 | [JP] | Japan | 60-89579[U] |

[51] Int. Cl.$^4$ .......................................... B62K 21/12
[52] U.S. Cl. .................... 74/551.8; 280/304.3; 74/488; 74/489; 74/551.9; 74/558; 2/17
[58] Field of Search ............ 74/551.8, 551.9, 488, 74/558, 489, 501 R; 280/289 G, 289 H, 289 S, 289 E, ; 296/78.1; 180/335, 315; 2/17

[56] References Cited

U.S. PATENT DOCUMENTS

| 3,701,546 | 10/1972 | Schwerdhofer et al. | 280/289 H |
| 3,845,847 | 11/1974 | Camp | 74/489 |
| 4,137,793 | 2/1979 | Sowell | 74/488 |
| 4,141,567 | 2/1979 | Scott | 74/551.9 |
| 4,191,065 | 3/1980 | Golobay et al. | 74/489 |
| 4,232,565 | 11/1980 | Leonheart | 74/489 |
| 4,286,700 | 9/1981 | Morris et al. | 74/488 |
| 4,352,303 | 10/1982 | Christner | 74/489 |
| 4,461,189 | 7/1984 | Rottenkolber et al. | 74/489 |
| 4,560,049 | 12/1985 | Uchibaba et al. | 74/488 |
| 4,641,723 | 2/1987 | Takanashi et al. | 280/289 H |
| 4,716,782 | 1/1988 | Jones | 74/501 R |

FOREIGN PATENT DOCUMENTS

| 456958 | 4/1950 | Italy | 74/551.8 |
| 505236 | 12/1954 | Italy | 2/17 |
| 541277 | 12/1954 | Italy | 74/551.8 |
| 515730 | 2/1955 | Italy | 74/551.8 |
| 1389679 | 4/1975 | United Kingdom | 74/551.8 |

Primary Examiner—Richard E. Moore
Assistant Examiner—Vinh Luong
Attorney, Agent, or Firm—Lyon & Lyon

[57] ABSTRACT

A throttle mechanism for a vehicle employing a handle grip for steering where the throttle lever is controlled by manual actuation. A shield plate may be provided on the throttle lever to physically block the air flow against the vehicle from flowing directly over the operator's thumb actuating the throttle. Heating elements may be provided to heat a cover on the throttle lever which in turn heats the driver's hand. Heat controlling circuits to effectively reduce the heating input at high temperatures, multiple circuits for both rapid and slow heating and circuitry associated with the vehicle lighting switches may be employed.

4 Claims, 11 Drawing Sheets

THROTTLE ACTUATOR FOR A VEHICLE

BACKGROUND OF THE INVENTION

The field of the present invention is throttle actuator mechanisms for use on vehicles of the type having at least one handle grip for steering with the throttle actuator associated with the steering mechanism for manual control.

Figure 1:
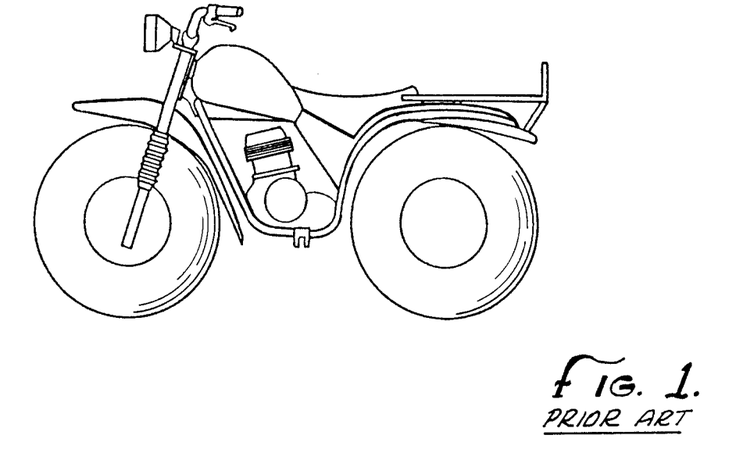
FIG. 1 is a side elevation of a three-wheel vehicle.
Figure 2:
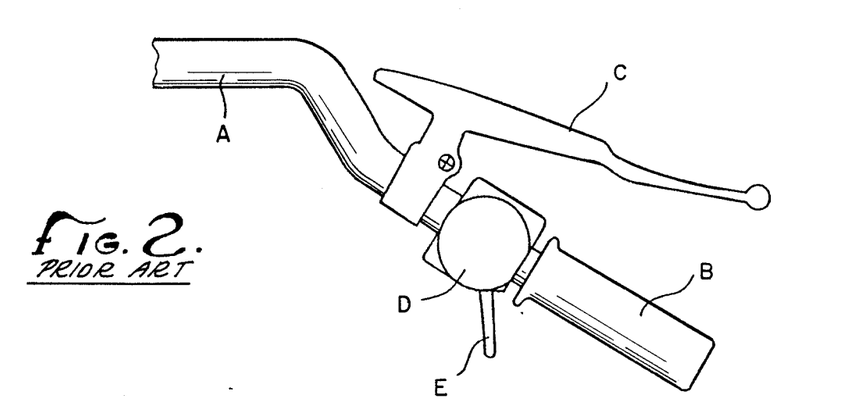
FIG. 2 is a plan view of a portion of a steering, brake and throttle control for the vehicle of FIG. 1.

Motorized three-wheel vehicles have been known which incorporate a saddle-type riding position, an engine controlled by a throttle actuator and handlebars including handle grips on the bars for steering. FIGS. 1 and 2 illustrate known such vehicles. FIG. 1 discloses the general arrangement of such a three-wheel vehicle while FIG. 2 illustrates a plan view of one portion of the handlebar A. The handlebar A includes a handle grip B and a brake lever C. Between the grip B and the mounting portion of the lever C, a throttle actuator mechanism D is arranged employing a throttle lever E projecting therefrom. The throttle lever E is arranged for actuation by means of the thumb of the operator whose hand is positioned on the grip B. The throttle lever E is conventionally of uncovered metal or metal covered with an anti-skid member of rubber or the like. The lever E is biased to an idle position by means of a spring. Accordingly, speed adjustments in driving the vehicle require pushing the throttle lever by means of some mechanism, most conveniently a thumb. When released, the throttle lever returns to its original idle position.

The orientation of the throttle lever is such in the foregoing devices that it is located somewhat below the right handle grip. Furthermore, the throttle actuator is generally swung in a substantially horizontal plane by the rider's right thumb. In such devices, there is generally a gap between the throttle lever and the handle grip. As a result, in cold running conditions, the operator's thumb is exposed to cold temperatures and wind from the vehicle's forward motion. Consequently, over long periods, such an arrangement is both inconvenient and uncomfortable. Furthermore, such metal throttle levers as have been employed tend to be cold to the touch and draw heat from the operator's hand.

SUMMARY OF THE INVENTION

The present invention is directed to a throttle actuator for a vehicle. Throttle actuators of the present invention are intended to reduce exposure to the elements of the actuator's operating hand and provide convenient mechanisms for such protection.

In a first aspect of the present invention, a cover mechanism is associated with a manual throttle lever, incorporating a shield device which cooperates with the handle grip itself to provide protection from the elements.

In a second aspect of the present invention, a warming mechanism is associated with the throttle lever to electrically heat the lever. Such heating mechanisms may be actuated in a number of ways and may incorporate a plurality of heater operating modes and controls. A heat generating body is arranged within a throttle lever cover such that the warmth thereof may be directed to the actuating finger or thumb of the operator. In this way, reduced exposure to the elements is achieved.

In controlling the heat generating mechanism, automatic controls may be provided which are responsive to pressure of the actuating thumb or finger. Thermal switches may be used, dual circuits for high and low heating can be employed with switching mechanisms either actuated independently or through other mechanisms such as the lights of the vehicle.

Accordingly, it is a principal object of the present invention to provide an improved throttle actuator for vehicles with enhanced protection for the operator from the environment. Other and further objects and advantages will appear hereinafter.

BRIEF DESCRIPTION OF THE DRAWINGS

FIGS. 17 (a) and (b) illustrate two circuit mechanisms for the device of FIG. 16.

DETAILED DESCRIPTION OF THE PREFERRED EMBODIMENT

Figure 3:
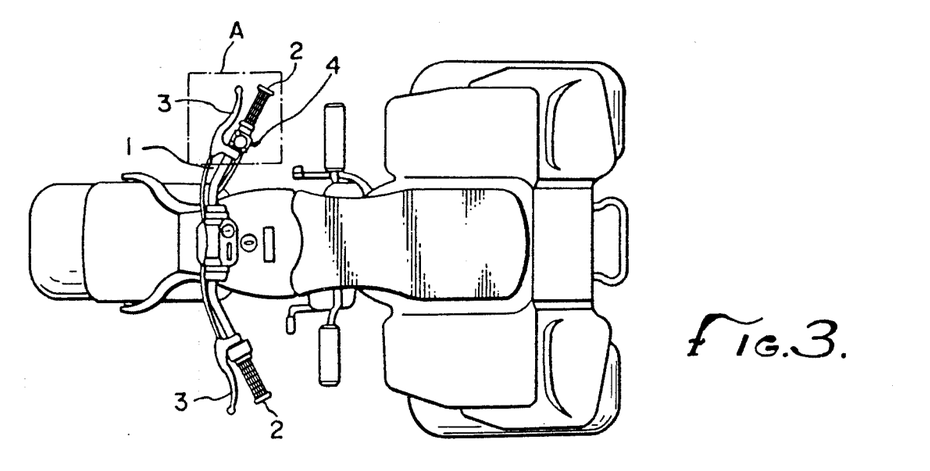
FIG. 3 is a plan view of a three-wheel vehicle of the type on which the present invention is employed.

Turning in detail to the drawings, FIG. 3 illustrates an entire plan view of a saddle-type three-wheel vehicle. A handlebar 1 is illustrated as including right and left handle grips 2. On each end of the handlebar 1 there is provided a brake lever 3. A throttle lever 4 is arranged beneath the handle grip 2 in such a manner that an operator holding the right handle grip 2 by his hand is able to manipulate the throttle lever 4 by use of his thumb. At the same time he is able to manipulate the brake lever 3 by use of his fingers.

Figure 4:
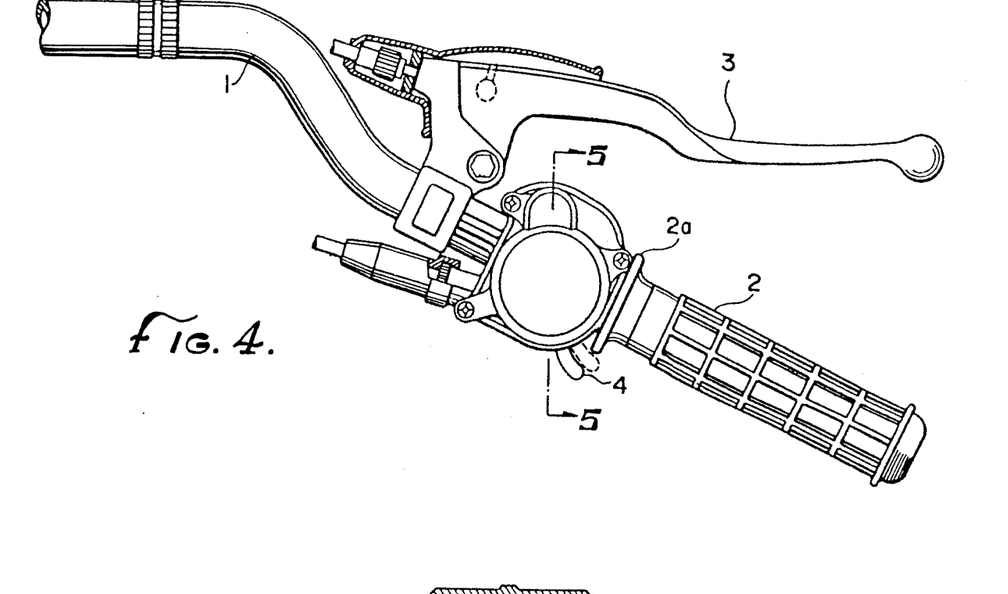
FIG. 4 is a plan view of the portion of FIG. 3 shown in the box A.
Figure 5:
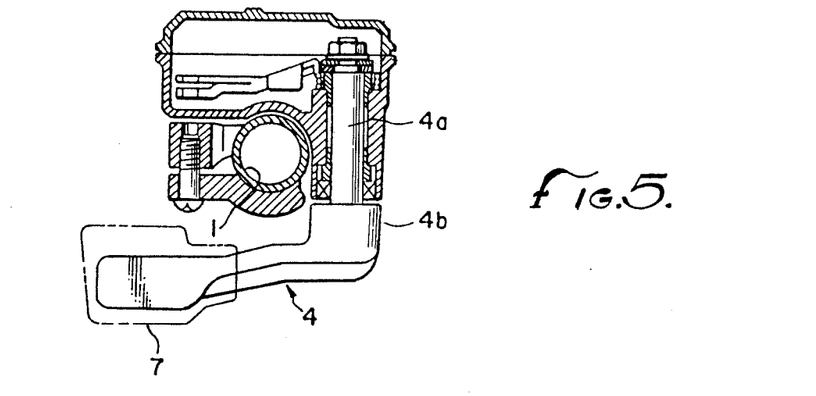
FIG. 5 is a cross-sectional view taken along line 5—5 of FIG. 4.
Figure 6:
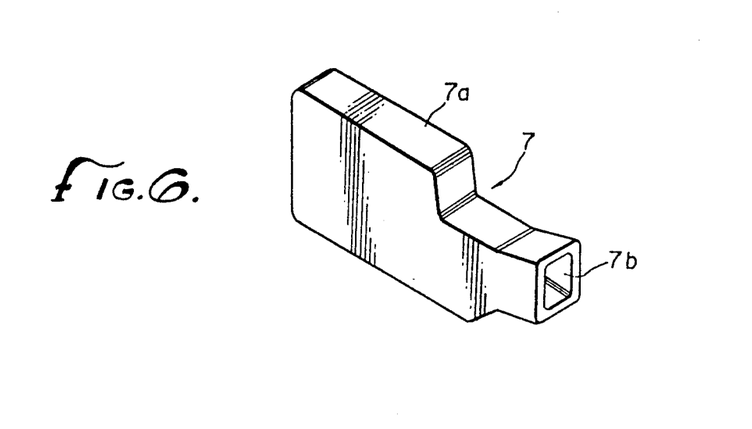
FIG. 6 is an oblique view of a throttle lever cover of the present invention.

Looking in further detail to FIGS. 4 and 5, the throttle lever 4 is supported by means of a shaft 4a such that the lever 4 is able to swing in a horizontal direction toward the handlebar 1. With the throttle lever 4 swinging toward the handlebar 1, the throttle is opened to realize greater power from an engine on the vehicle. Upon release of the thumb, the lever returns to an idle condition.

Figure 7:
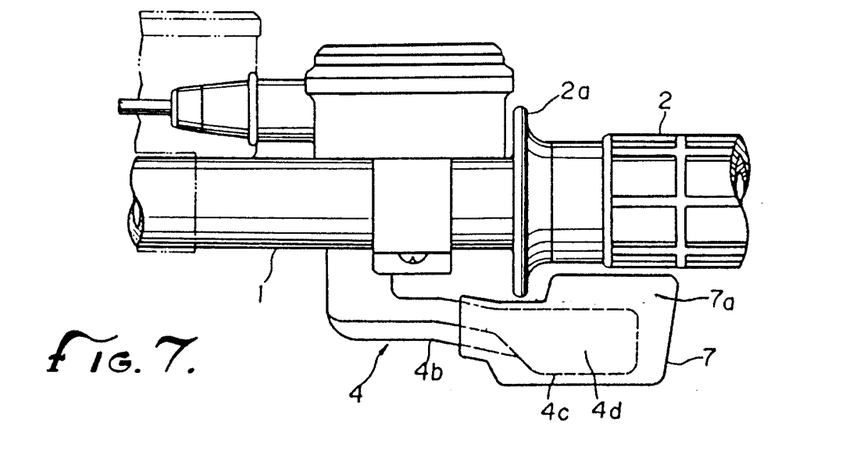
FIG. 7 is back view of the mechanism illustrated in FIG. 4.

A cover 7 for the lever 4 is employed to define a shield plate for shielding the operator's thumb from the elements. The cover is preferably of rubber or plastic or the like in order that it might be easily positioned on the throttle lever 4 through use of the cavity 7b. The cover 7 defining the shield plate includes an upwardly extending flange 7a to cooperate with the handle grip 2 as can best be seen in FIG. 7. The flange 7a extends upwardly to above the lower portion of the flange 2a on the inner end of the handle grip 2. In this way, wind is inhibited from blowing through between the throttle lever and the handle grip.

The internal cavity 7b of the cover is shaped to conform to the distil end of the throttle lever 4. The throttle lever 4 is designed with an end portion 4d which has a broadened portion 4c. The shank portion 4b of the lever is narrower than the end portion. Consequently, the conforming cover 7 has a small opening for the cavity 7b which then opens out in the interior of the cover. This arrangement helps to maintain the cover 7 in place on the lever.

Figure 8:
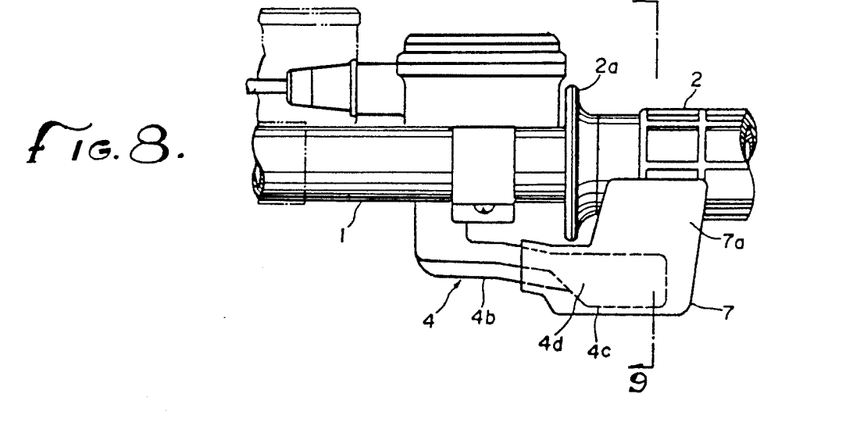
FIG. 8 is a back view of the mechanism of FIG. 7 illustrating a second shield plate embodiment.
Figure 9:
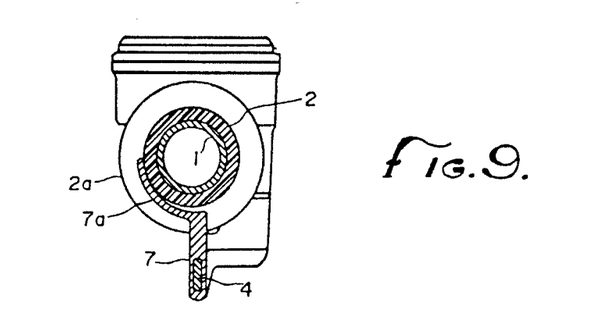
FIG. 9 is a cross-sectional view taken along line 9—9 of FIG. 8.
Figure 10:
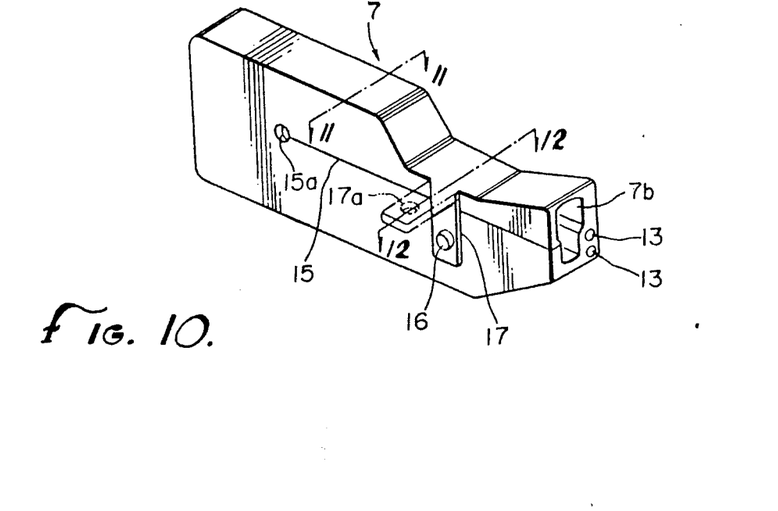
FIG. 10 is an oblique view of another embodiment of a cover for a throttle lever.
Figure 11:
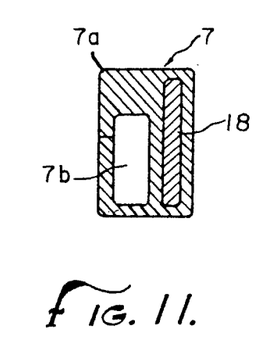
FIG. 11 is a cross-sectional end view as cut along line 11—11 of 10.
Figure 12:
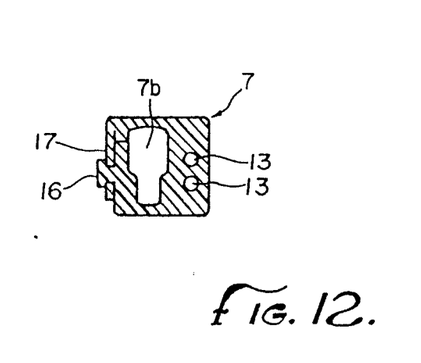
FIG. 12 is a cross-sectional end view as cut along line 12—12 of FIG. 10.
Figure 13:
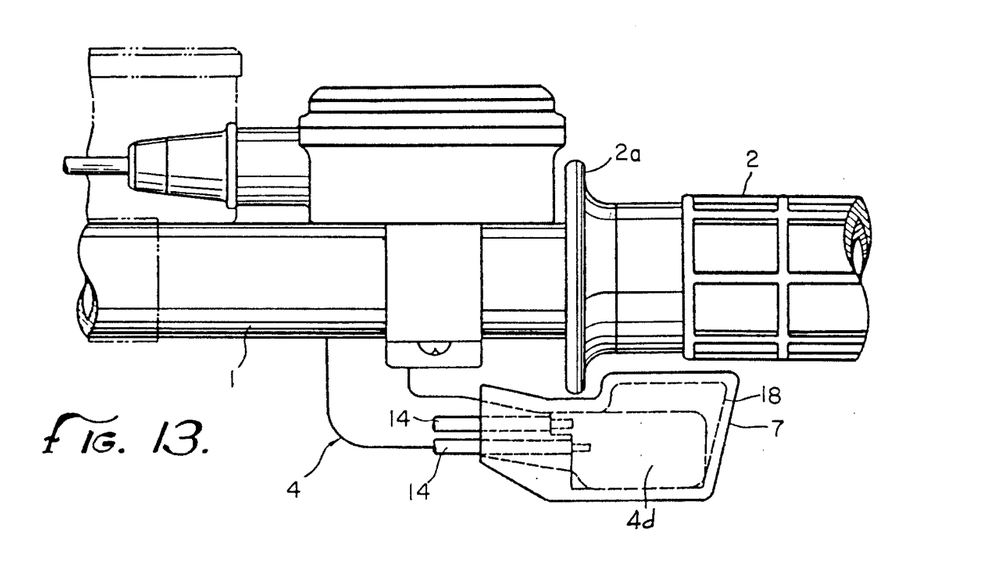
FIG. 13 is a rear view of yet another embodiment of the present invention.
Figure 14:
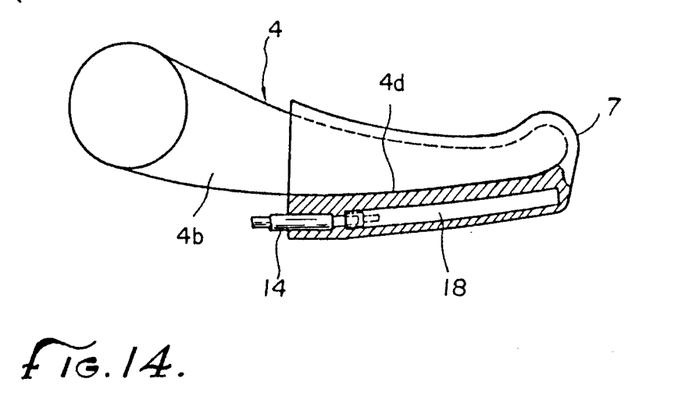
FIG. 14 is a cross-sectional plan view of the throttle lever and cover of FIG. 13.

FIGS. 8 and 9 illustrate another embodiment. In this embodiment, the shield plate 7a extends further upwardly to a position behind the handle grip 2. As the throttle lever is moved forwardly, the rear portion of the handle grip 2 is covered by the plate 7a as can best be seen in FIG. 9. This arrangement further excludes wind from passing between the throttle lever and the handle grip. Furthermore, the exaggerated shield plate 7a of FIGS. 8 and 9 can act to provide certain interference between the cover 7 and the handle grip 2 so as to prevent excessive actuation of the throttle lever 4. Naturally, the cover 7 and lever 4 may be integrally formed in these embodiments.

Looking to another embodiment of a throttle lever cover 7, reference is made to FIGS. 10 through 14. The upper portion of the cover 7 is extended upwardly to narrow the gap between the handle grip 2 and the throttle lever 4 as in the prior embodiments. Furthermore, the inside of the throttle lever cover 7 is hollow to correspond to the end portion of the throttle lever 4 as discussed above. Again, the interior of the throttle lever cover 7 is larger than the opening of the cavity 7b. Cord holes 13 extend inwardly parallel to the cavity 7b from the same end of the cover to accommodate cords 14.

A slit 15 extending from the opening of the cavity 7b is formed in a front surface of the throttle lever cover 7. The front surface is the side which the thumb does not engage. The slit 15 is convenient for inserting the throttle lever 4 into the cavity 7b. A hole 15a is provided to prevent the slit 15 from being torn at its end. An engaging projection 16 extends from the lower portion of the front surface of the throttle lever cover 7, below the slit 15. From the front upper edge portion of the front surface of the throttle lever 7 an engaging band 17 extends. The engaging band 17 is provided with an engaging hole 17a to engage with the projection 16. In this way, once the cover 7 is placed on the throttle lever 4, the slit 15 may be closed by means of the projection 16 and band 17.

On the back side of the throttle lever cover 7 where the thumb of the operator does rest against the throttle lever, a plate is located within the cover 7. The plate is an electrically-conductive heat-generating body 18 which may be coupled with the electrical cords 14. The electrically-conductive heat-generating body 18 employs resistance heating through a circuit imbedded therein. Power is supplied by means of the cords 14 to generate a desired heating effect in the cover 7. The power supply cords 14 are drawn out from the cover 7 through the holes 13 and are connected to a power supply such as a battery or the like. A switch may be arranged for controlling the heating effect of the body 18.

To employ the cover 7 of this embodiment, the throttle lever cover 7 is arranged with the engaging band 17 disassociated from the engaging projection 16. The slit 15 is then able to open up as the cover is positioned on the throttle lever 4. The engaging band 17 is then engaged with the projection 16 by means of the engaging hole 17a to form a tight fit and retain the cover on the throttle lever.

The electrical cords 14 may then be coupled with a power source which can be turned on to combat the cold of the environment during operation of the vehicle. As before, the cover 7 also is shown to extend upwardly to partially close the gap between the throttle lever 4 and the handle grip 2. Naturally, the resiliency and shape of the throttle lever cover 7 and the shape of the throttle lever 4 affect the need for the slit 15 which may be eliminated when appropriate.

Figure 15:
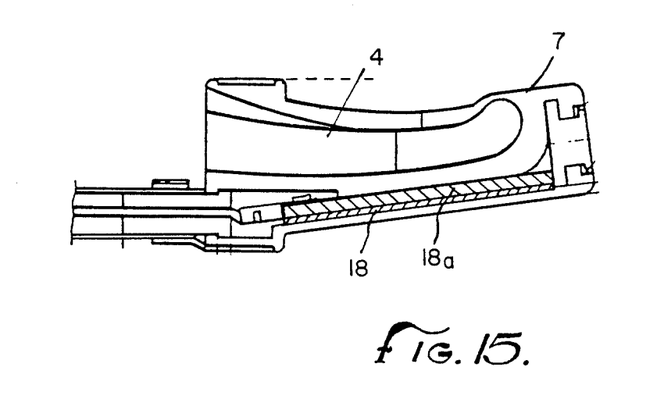
FIG. 15 is a cross-sectional plan view of a modified embodiment of the device as illustrated in FIG. 14.

To further enhance the operation of the electrically-conductive heat-generating body 18, a further embodiment is illustrated in FIG. 15 which includes an insulating layer 18a associated with the body 18. The insulating layer 18a is positioned between the heat-generating body 18 and the end portion of the throttle lever 4. The insulation insures that more heat is directed toward the surface of the cover 7 for beneficial results and less heat is directed toward the heat sink of the throttle lever 4.

Figure 16A:
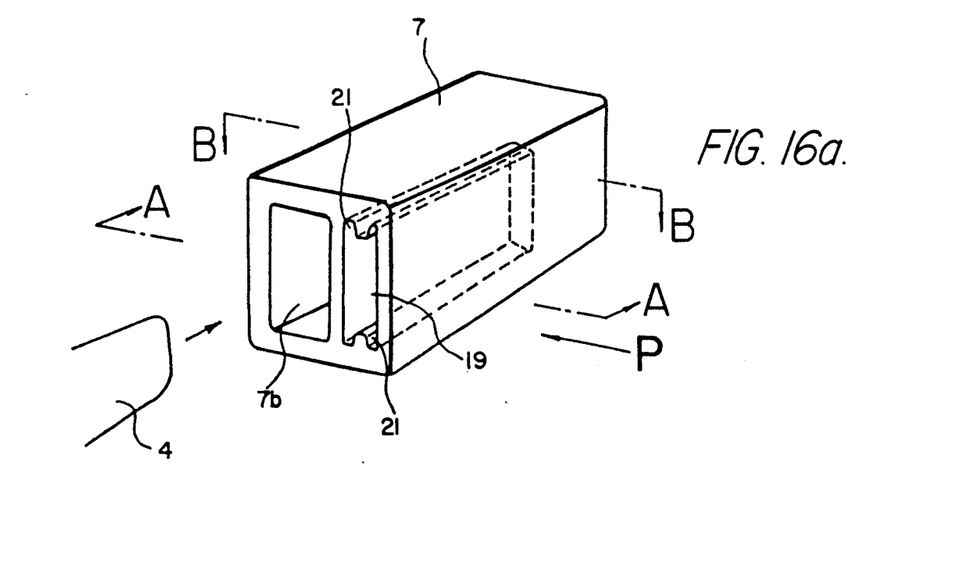
FIG. 16(a) is oblique view of fur embodiment of a throttle lever over of the present invention.
Figure 16B:
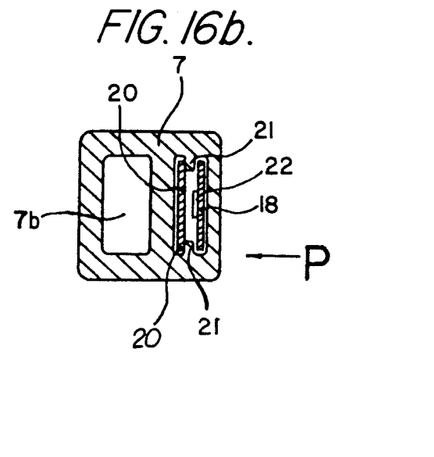
FIG. 16(b) is a cross-sectional view of the cover of FIG. 16(a) as cut along line A—A of FIG. 16(a).
Figure 16C:
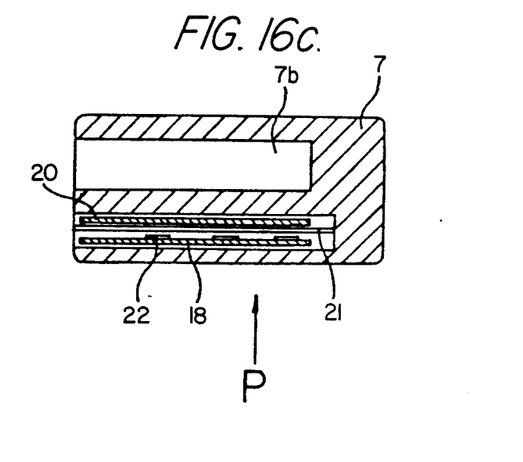
FIG. 16(c) is cross-sectional view of FIG. 16(a) as cut along line B—B of FIG. 16(a).

In yet another embodiment illustrated in FIG. 16, the cavity 7b is employed in the cover 7 to accommodate the distil end of the throttle lever 4. Roughly parallel and adjacent to the cavity 7b is a second cavity 19. The second cavity 19 is elongate to accommodate a plate-like electrically-conductive heat-generating body 18. A contact member 20 is also accommodated within the elongate cavity 19 to cooperate with the electrically-conductive heat-generating body 18.

The body 18 and the contact member 20 are resiliently biased from one another by inwardly projecting elements 21 which extend substantially the length of the elongate cavity 19. The material of the cover is preferably rubber or other resilient material such that the body 18 and the member 20 may be pressed toward one another. Contacts 22 on the heat-generating body 18 may improve the ability of the mechanism to complete an electrical circuit in the elongate cavity 19. In FIG. 16, reference arrow P illustrates the direction of pressure of the thumb of an operator in advancing the throttle lever 4. It can be seen that the elongate cavity 19 with the heat-generating body 18 and the contact member 20 are arranged substantially orthoganal to the pressure P. Consequently, as the throttle lever is advanced by the pressure P, the heat-generating body 18 comes into contact with the contact member 20. This closes a circuit which allows electricity to generate heat within the heat-generating body 18.

Figure 17A:
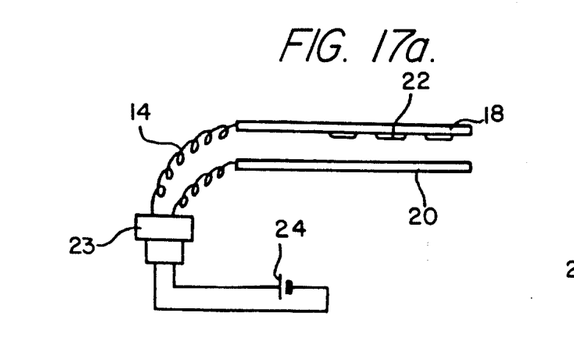
Figure 17B:
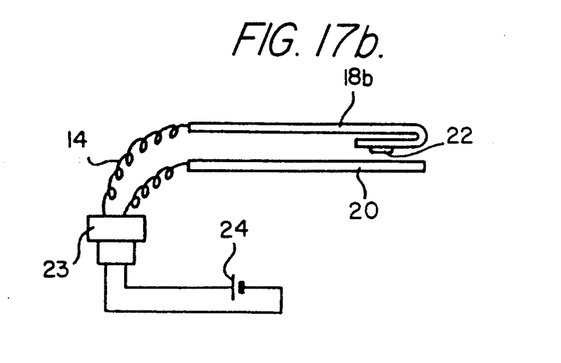
Figure 18:
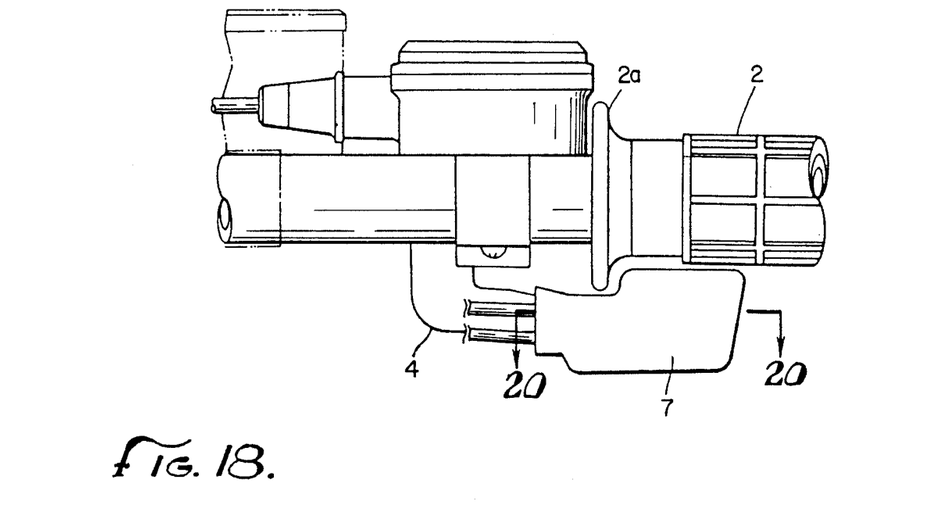
FIG. 18 is a back view of a further embodiment of the present invention.
Figure 19:
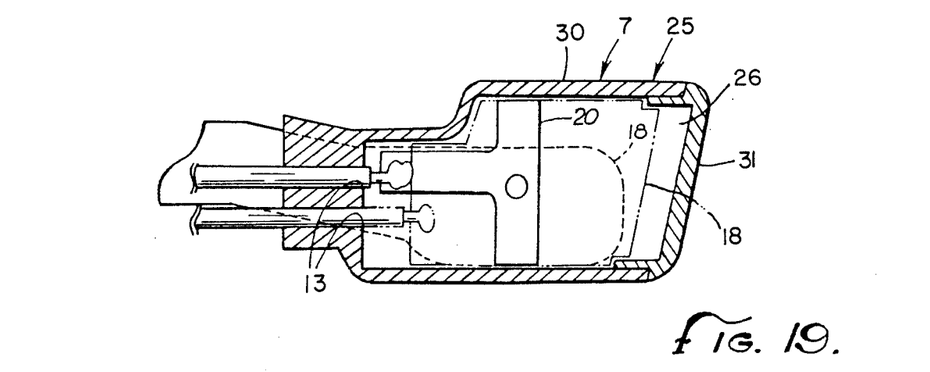
FIG. 19 is a vertical cross section of the throttle lever mechanism of FIG. 18.
Figure 20:
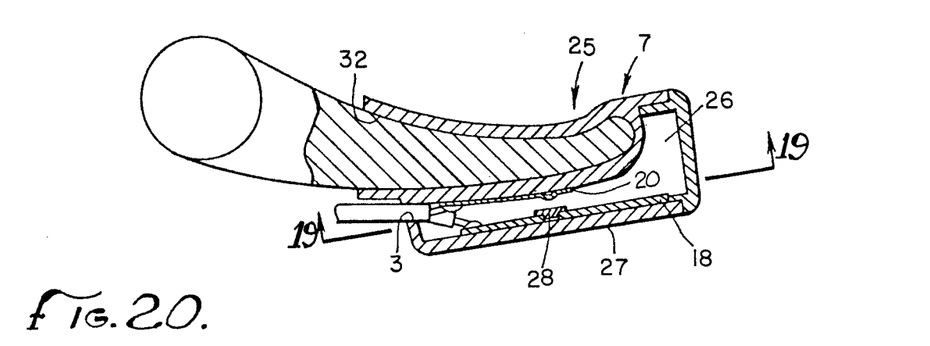
FIG. 20 is a cross-sectional plan view of the device of FIG. 18 taken along line 20—20 of FIG. 18.
Figure 21A:
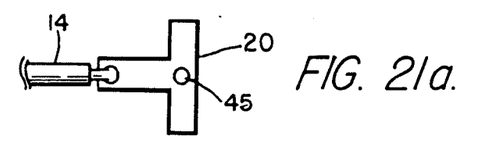
FIG. 21 illustrates a plan view of a contact in (a), a plan view of a heat-generating member in (b) and a cross section in (c) taken along line C—C of (b).
Figure 21B:
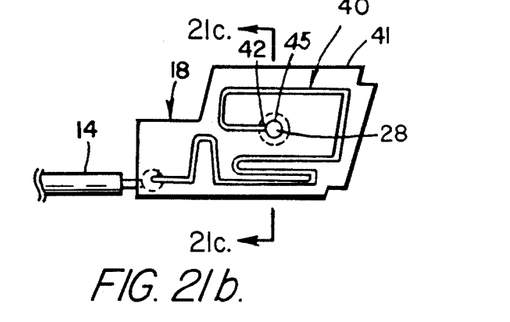
Figure 21C:
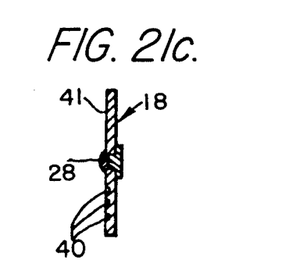
Figure 22:
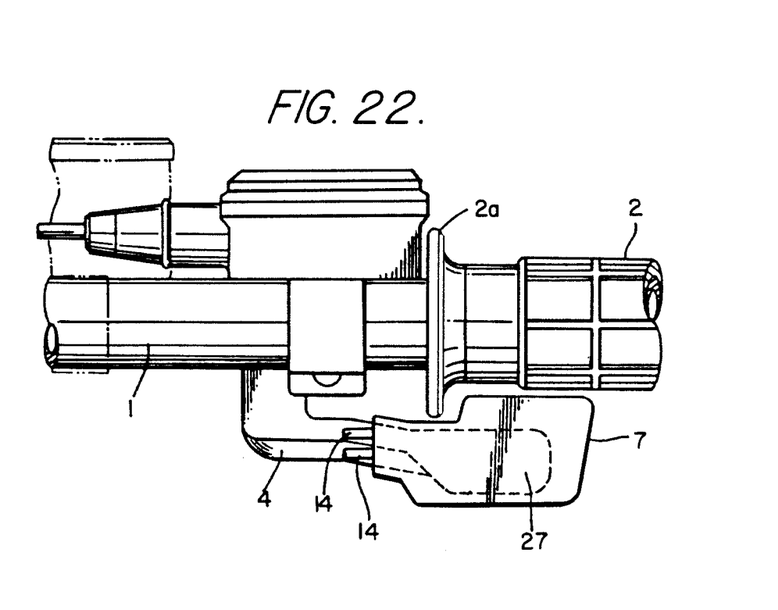
FIG. 22 is a back view of yet another embodiment of the present invention.

A circuit incorporating the heat-generating body 18 and the contact member 20 is illustrated in FIG. 17a. Completing the circuit with these components through the cords 14 is a connector 23 coupled with a power supply 24. In FIG. 17(b) a modified heat generating body 18b is illustrated including but a single contact 22. The U-shaped end portion of the body 18b defines a single contact area more displaced from the main portion of the heat-generating body 18. Naturally, the configurations are such that the contacts 22 may be located on the contact member 20, retaining the heat-generating body 18 as a flat plate member.

In operation with the embodiments of FIGS. 16 and 17, when the throttle actuator is pushed in the direction P to manipulate the throttle lever 4, the housing 7 transmits the manipulating pressure to the lever. However, the resiliently biased body 18 and member 20 are pressed together to provide a completed electrical contact. With this contact, the closed circuit provides current flow through the heat-generating body 18. Consequently, the cover 7 and, in turn, the rider's thumb manipulating the throttle lever 4 are warmed.

When the thumb of the operator is released from the throttle actuator, the circuit is opened by the biasing of the body 18 away from the member 20. The resilient projections 21 provide this separating action to open the circuit and turn off the heating effect. In this way, battery consumption is avoided when the heating elements are not required. The spring effect of the projections may be accomplished by other means. However, the employment of such projections is relatively simple and inexpensive.

Looking next to the embodiment of FIGS. 18 through 21, further features are illustrated. The cover 7 includes a cover body 25 shaped in a substantially rectangular form and forming a cavity 26 therein. A heat-generating body 18 is mounted on an inner wall of the surface 27 of the cover body 25 which receives the actuating thumb of the operator. This inner wall of the surface 27 forms part of the inner cavity 26. A temperature controlling element 28 is mounted on the heat-generating body 18. A contact member 20 is mounted to the opposite inner wall within the cavity 26 from the heat-generating body 18. The cover 7 may then be pressed by an operator against the surface 27 so as to resiliently contact the temperature controlling element 28 with the contact member 20. Thus, as the operator applies the throttle, an automatic switching occurs to provide an ON or OFF mechanism for supplying current to the heat-generating body 18.

The body 25 of the cover 7 comprises a body portion 30 and a lid 31. The lid 31 is mounted directly onto the body portion 30. The body portion 30 is also provided with a hole 32 into which the throttle lever 4 is inserted. The cavity 26 is sealed by mounting the lid portion 31 on the body portion. Cord holes 13 accommodate lead wires 14 inserted to communicate with the contact member 20 and the heat-generating body 18. Again, a flange may be provided to define a shield plate for eliminating wind between the handle grip 2 and the throttle lever 4.

To provide the appropriate resiliency as well as rigidity for the cover, a rubber or plastic is preferred. In this embodiment, acrylic rubber, EPDM resin or the like is considered preferable. The lid 31 may be formed of a hard resin such as ABS resin, polypropelene resin, AS resin or the like.

Looking specifically to the heat-generating body 18 as shown in FIGS. 7(b) and (c), a heat-generating circuit 40 is formed by a tungsten element or the like positioned on an insulating base plate 41. The insulating base plate may be a rectangular sheet made from glass, epoxy or the like. At the center of the heat-generating body 18 is a hole through which a cylindrical temperature controlling element 28 is soldered to one terminal 42 of the heat-generating circuit 40. The heat generating circuit 40 is then connected with a power supply by means of lead wires 14. Desirably, the heat generated by the heat-generating circuit 40 may be in the range of about 2 to 10 watts. Heat generation in excess of 10 watts may result in overheating. Heat generation at a rate of less than 2 watts does not obtain a sufficient heating effect. The heat-generating body 18 is designed such that the heat-generating circuit 40 is adhered to the inner wall of the cavity 26 toward the surface 27. As a temperature controlling element, a positive property thermister may be employed such that the resistance of the thermister becomes high with increased temperature. It is preferred that the resistance value vary at a relatively low temperature range, for example 40 to 80 degrees C. A thermister of berium titanate, silicon or the like may be employed in such applications.

The contact member 20 for the automatic switch consists of a metal T-shaped sheet as illustrated in FIG. 7(a). One end of the contact is connected with the power supply by means of a lead wire 14. At the center of the contact 20 a projection 45 is formed. In this manner, the projection 45 and the thermister 28 are able to form switch contacts actuated by thumb pressure on the cover 7. Through the use of the thermister, variable temperature dependent resistance is achieved at the contact. A gap between the temperature controlling element 28 and the contact 45 on the contact member 20 is preferably less than three millimeters. When the gap is larger than three millimeters, the operator experiences a substantial sinking feeling in the cover when the throttle lever is actuated.

In operation, the embodiment of FIGS. 18 through 21 operates in a similar manner to the prior embodiments. Pressure from the operator's thumb in actuating the throttle lever 4 also controls the switch to turn on the heat-generating body 18. To avoid overheating, the thermister 28 increases resistance above a selected temperature. Naturally, when the temperature of the element is low, substantial heating is accomplished. With the circuit provided as shown with the thermister incorporated into the switch, manufacturing is simplified and costs are reduced. Naturally, other circuit configurations may be employed where advantageous.

Figure 23:
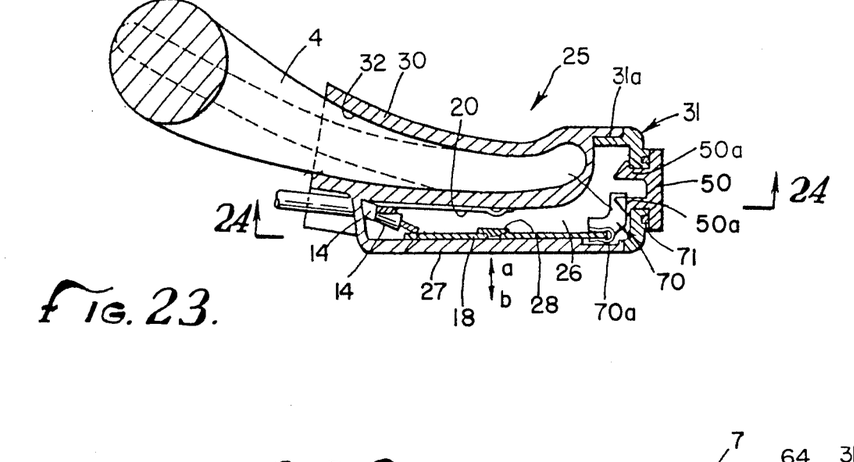
FIG. 23 is a cross-sectional plan view of the embodiment of FIG. 22.
Figure 24:
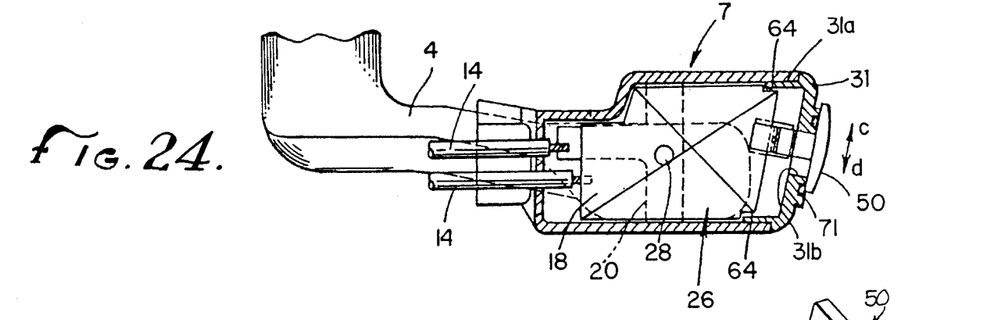
FIG. 24 is cross-sectional view taken along line 24—24 of FIG. 23.
Figure 25:
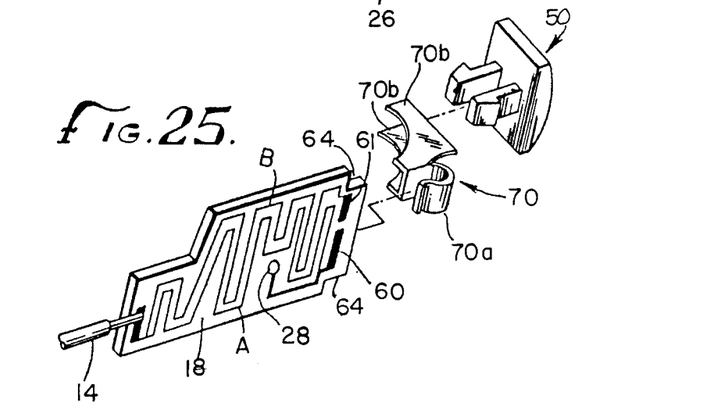
FIG. 25 is an exploded assembly view in perspective of a switch mechanism of an embodiment of the present invention.

Turning next to the embodiments of FIGS. 22 through 27, two parallel heat-generating circuits are shown to be employed. In this way, both high and low heating may be selected by the operator to optimize operator comfort. The throttle lever cover 25 including the cover body 13 is shaped to accommodate the heater device as set forth in the prior embodiments. The lid 31 functions as a base in this embodiment for a switch 50. The switch 50 is designed for switching between high and low heating modes of the heat-generating body 18. The knob or switch 50 is mounted on the lid 31 so as to be capable of sliding up and down in directions c and d as indicated in FIG. 24.

The heat-generating body 18 incorporates a base plate 41 which is adhered to the inner wall surface of the cavity 26 and is capable of resiliently moving in the direction of arrows a and b illustrated in FIG. 23 when the surface 27 is manipulated through actuation of the throttle lever 4. The heat-generating body 18 is also provided with a temperature controlling element 28 which serves, at the same time, as a movable contact mounted on the base plate 41. The contact member 20 is adhered to the inner wall surface of the cavity 26 in a manner so as to provide for a switching function.

On the base plate 41 are heat generating circuits, again formed by tungsten filaments or the like. A circuit A is designed for both high and low heating operation while a circuit B is arranged for high heating only. Each of the heat generating circuits A and B is connected with a source of power through cord 14. The other end of the heat-generating circuit A is connected with the temperature controlling element 28 fixed to the center of the base plate 41. A portion of the circuit A is formed as an elongate contact 60. This contact is aligned with a similar contact 61 associated with the end of the circuit B. The contacts are aligned to allow for easy switching as will be discussed below.

Figure 26:
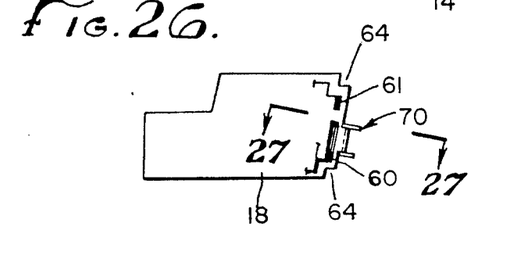
FIG. 26 is an assembled plan view of the mechanism of FIG. 25.
Figure 27:
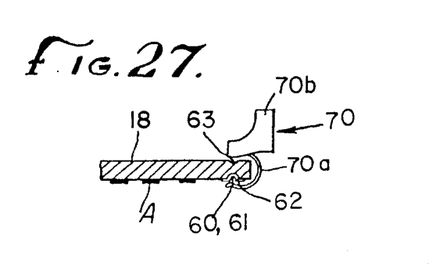
FIG. 27 is a cross-sectional view taken along line 27—27 of FIG. 26.

The contacts 60 and 61 are arranged with grooves 62 and 63 as illustrated in FIG. 26 in order to provide easy sliding for a contact therebetween. The contacts 60 and 61 are designed to accommodate the curvature of the groove 62. The base plate 41 is shown to have a cutout 64 at its upper and lower ends. As shown in FIG. 24, these cutouts 64 engage the inner portions 31a of the lid 31. This positions the base plate 41 so that there is no vertical play in the cover.

Associated with both the switch 50 and the base plate 41 at the contacts 60 and 61 is a switch contact 70. The switch contact is capable of moving up and down on the base plate so as to contact either the contact 60 alone or both the contacts 60 and 61. In this way, the contacts may be connected or disconnected to associate the parallel circuit B with the circuit A. The switch contact 70 defines a horseshoe-shaped body 70a so as to ride within the grooves 62 and 63 as can best be seen in FIG. 27. This allows the contact 70 to slide between contacts 60 and 61.

Associated with the switch contact body 70a are projecting pieces 70b. These projecting pieces 70b extend in a perpendicular manner to the grooves 62 and 63. Furthermore, the projecting pieces 70b are spaced vertically one from the other to form a horizontal space therebetween. The projecting pieces 70b are thus able to engage the switch body 50 such that the contact 70 may slide laterally relative to the switch body 50 and yet must move vertically with the switch body 50.

The switch 50 employs resilient engaging members 50a to retain the switch 50 in the lid 31. Thus, the body of the switch 50 extends through an opening 31b to the resilient engaging pieces 50a. It is one of the resilient engaging pieces #a which engages the projecting pieces 70b. A sealing member 71 prevents moisture from entering the cover around the switch 50.

Through the foregoing switch contact 70, the switch 50 may be actuated in an up and down motion indicated as c and d in FIG. 24. This up and down motion requires the switch contact 70 to move between contacts 60 and 61 on the base plate 41. At the same time, the projecting pieces 70b allow relative motion between the switch contact 70 and the switch 50 in the lateral direction. Thus, movement of the heat-generating body 18 in the directions a and b as seen in FIG. 23 is possible.

The two circuits A and B in embodiment of FIGS. 22 through 27 are arranged such that either the A circuit is actuated or both the A and B circuit are actuated. Thus, the A circuit provides both a low and high use while the B circuit only contributes to the high heating mode. By moving the switch 50 upwardly, both A and B circuits are engaged and the heating mode is high. When the switch 50 is moved downwardly, only the A circuit is engaged and the heating mode is low. At the same time, the automatic switch resulting from depression or release of the cover when actuating the throttle lever turns on and off the heating circuit depending on use. Finally, the thermister employed prevents overheating under continuous throttle-on conditions.

Figure 28:
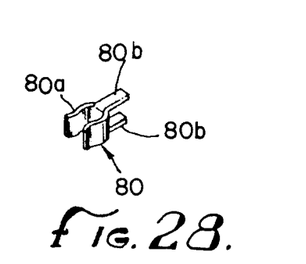
FIG. 28 is an oblique view of a second contact element as may be employed with a switch mechanism as in FIG. 25.

An alternate switch contact 80 is illustrated in FIG. 28. The contact member 80 is designed to employ projecting pieces 80b at the back side of the contact body 80a which is curved in a horseshoe shape as in the above embodiment. When using this switch contact 80, it is necessary to rearrange the switch knob 50 so as to provide an element extending to between the projecting pieces 80b.

Figure 29:
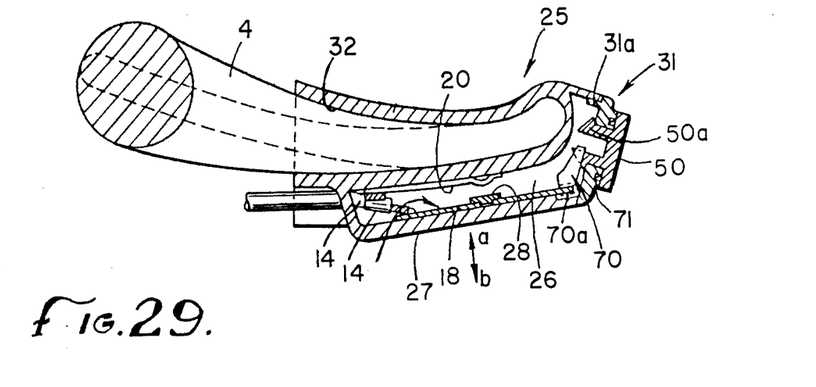
FIG. 29, is a cross-sectional plan view as in FIG. 23 illustrating a mod end portion thereof.

As can be seen in FIG. 29, a device substantially identical to the device illustrated in FIG. 23 is shown with the exception that the end piece is angled so as to face more toward the operator. With the switch 50 facing more toward the operator, actuation may become easier and observation of the position of the switch might also be improved.

Figure 30:
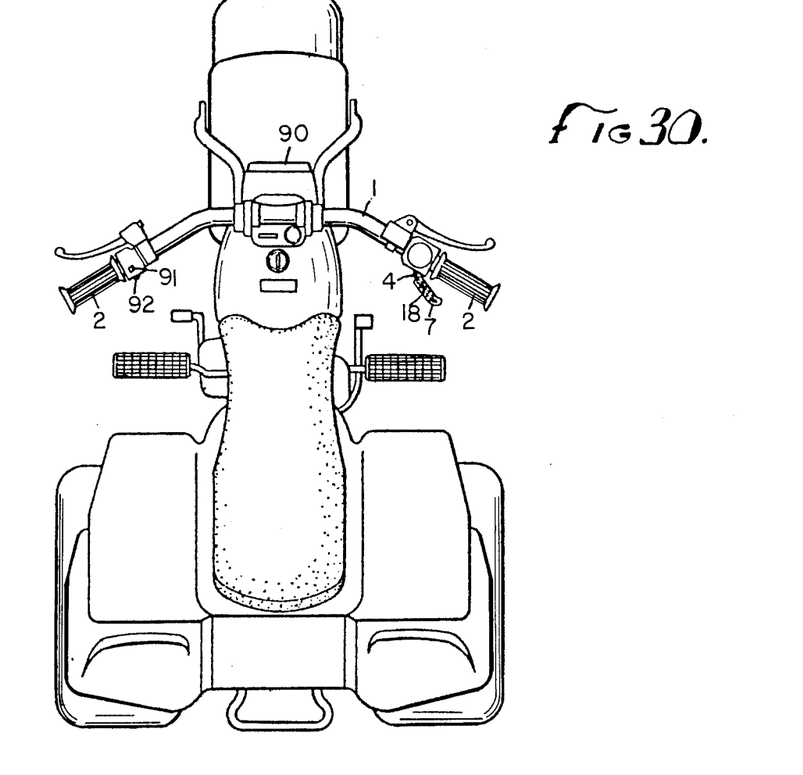
FIG. 30 is a plan view of a three-wheel vehicle incorporating the invention.
Figure 31:
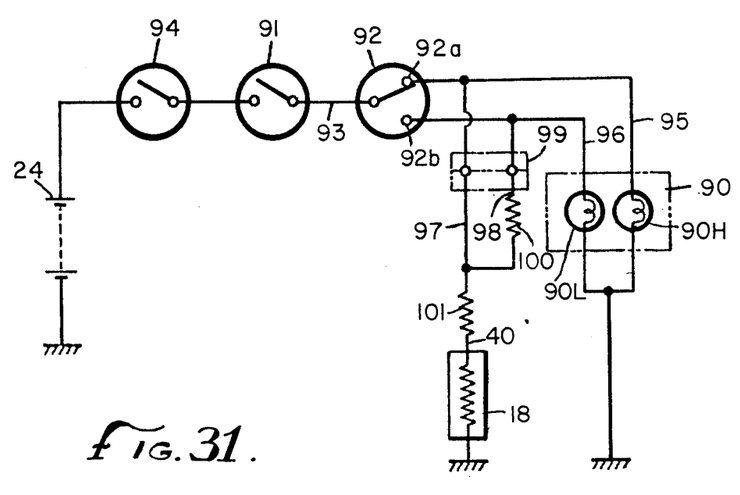
FIG. 31 is a circuit diagram of the device employed in the embodiment of FIG. 30.

Looking lastly to the embodiment of FIGS. 30 and 31, a three-wheel vehicle is illustrated which incorporates a headlamp 90 controlled by a light switch 91 for turning on and off the headlight. A dimmer switch 92 is also provided to selectively actuate a filament 90H for high beams and a filament 90L for low beams. The dimmer switch 92 incorporates switch contacts 92a and 92b for selecting between beam filaments.

Adjacent the right handle grip 2 of the vehicle is a throttle lever 4 which controls the output of an engine. The throttle lever 4 is manipulated by the thumb of the rider as discussed above. It is arranged to have a cover 7 into which a heating element 18 is positioned.

Looking specifically to FIG. 31, a main circuit 93 is connected with a battery 24 which provides a power supply for the lights and heater. The battery is located on one side of an ignition switch 94 while the light switch is located on the other side thereof. The light switch 91 is arranged in series with the dimmer switch 92. The resistance in the filament 90L for the low beam is greater than that in the filament 90H for the high beam. Again, the beams are selected by selecting the dimmer switch contacts 92a and 92b.

The main beam circuit 95 and the low beam circuit 96 are connected to a strong circuit 97 and a weak circuit 98, respectively, through a coupler 99. The weak circuit 98 has a greater resistance than the strong circuit 97 because of a resistor 100 inserted therein. A heater circuit 40 is commonly connected to the circuits 97 and 98 with a resistor 101.

Through the foregoing circuitry, when the high beam circuit is selected, maximum power is provided to the heater 18. When the low beam circuit is selected, a lesser amount of power is provided. Because high beam lights are generally employed for fast running with low beam lights used for low speeds, the amount of heating may approximate the need imposed by the air flow to the vehicle under running conditions. This mechanism reduces the number of switches required for the vehicle. This naturally reduces costs and complication. In warm seasons when the throttle lever cover may get hot, the circuit may be simply disconnected.

Thus, improved throttle actuators have been disclosed which lessen the effects of the environment on an operator of a small vehicle. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A throttle mechanism in combination with a vehicle having a steering device including a handlebar, a handle grip on the end of said handlebar containing a flange extending substantially perpendicularly to the inner end thereof, said throttle mechanism being attached to said handlebar and comprising:
   a throttle lever disposed subjacent said handle grip and being pivotally mounted to said throttle mechanism for movement toward said handle grip flange in a generally horizontal plane substantially parallel to the plane of said handlebar;
   a shield plate mounted on said throttle lever including a flange portion extending upwardly to a position to locate the upper peripheral edge of said flange portion above the lowermost portion of said handle grip flange, whereby said flange portion cooperates with said handle grip flange to restrict a gap between said throttle lever and said handle grip when pivotal movement of said throttle lever places said shield plate adjacent said handle grip.

2. The throttle mechanism as recited in claim 1 wherein said shield plate flange portion extends upwardly to an extent sufficient to engage said handle grip when said throttle lever is pivoted toward said handle grip.

3. The throttle mechanism as recited in claim 1 in which said shield plate is defined by a removable cover installed on said throttle lever.

4. The throttle mechanism as recited in claim 3 in which said removable cover is formed of flexible material.

* * * * *